US010613971B1

(12) United States Patent
 Vasikarla (10) Patent No.: US 10,613,971 B1
(45) Date of Patent: Apr. 7, 2020

(54) AUTONOMOUS TESTING OF WEB-BASED APPLICATIONS

(71) Applicant: INTUIT INC., Mountain View, CA (US)

(72) Inventor: Raj Vasikarla, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/869,194

(22) Filed: Jan. 12, 2018

(51) Int. Cl.
 *G06F 11/36* (2006.01)
 *G06F 40/14* (2020.01)
 *G06F 40/174* (2020.01)

(52) U.S. Cl.
 CPC ...... *G06F 11/3692* (2013.01); *G06F 11/3664* (2013.01); *G06F 40/14* (2020.01); *G06F 40/174* (2020.01)

(58) Field of Classification Search
 None
 See application file for complete search history.

(56) References Cited

U.S. PATENT DOCUMENTS

| | | | | |
|---|---|---|---|---|
| 6,847,976 B1 * | 1/2005 | Peace | ...................... | G06F 17/18 |
| 8,302,080 B2 * | 10/2012 | Wassermann | ....... | G06F 11/3688 717/131 |
| 8,429,614 B2 * | 4/2013 | Zhang | ................. | G06F 11/3684 714/37 |
| 8,448,131 B2 * | 5/2013 | Ottavi | ................. | G06F 11/3672 717/104 |
| 8,533,532 B2 * | 9/2013 | Wenig | ................. | G06F 11/3495 714/33 |
| 8,649,995 B2 * | 2/2014 | Thulasidasan | ...... | G06F 11/3684 702/119 |
| 8,930,275 B2 * | 1/2015 | Heizmann | ........... | G06F 11/3664 705/50 |
| 8,935,575 B2 * | 1/2015 | Patwardhan | ........ | G06F 11/3684 714/38.1 |
| 9,507,700 B1 * | 11/2016 | Vignet | ................ | G06F 11/3688 |
| 9,753,843 B2 * | 9/2017 | Kandpal | ............. | G06F 11/3672 |
| 9,824,075 B1 * | 11/2017 | Gross | ...................... | G06F 11/36 |
| 2008/0127094 A1 * | 5/2008 | Squires | ..................... | G06F 8/75 717/124 |
| 2009/0125976 A1 * | 5/2009 | Wassermann | ............. | G06F 8/00 726/1 |
| 2009/0319832 A1 * | 12/2009 | Zhang | ................. | G06F 11/3684 714/38.1 |
| 2010/0192220 A1 * | 7/2010 | Heizmann | ........... | G06F 11/3664 726/19 |
| 2012/0259576 A1 * | 10/2012 | Thulasidasan | ...... | G06F 11/3684 702/123 |

(Continued)

*Primary Examiner* — Matthew J Brophy
(74) *Attorney, Agent, or Firm* — Patterson + Sheridan, LLP (57) ABSTRACT

Certain aspects of the present disclosure provide techniques for autonomously testing a web-based application. The techniques generally include an analysis module searching a page of the web-based application for one or more fillable form fields and identifying a fillable form field in the page. The analysis module determines a field type associated with the fillable form field, determines a field data format based on the field type of the fillable form field and generates a test data entry based on the field data format. The analysis module then enters the test data entry into the respective fillable form field and submits the test data entry to a server.

20 Claims, 8 Drawing Sheets

(56) References Cited

U.S. PATENT DOCUMENTS

| | | | |
|---|---|---|---|
| 2013/0139003 A1* | 5/2013 | Patwardhan | G06F 11/3684 |
| | | | 714/32 |
| 2015/0127575 A1* | 5/2015 | Heizmann | G06F 11/3664 |
| | | | 705/342 |
| 2015/0242306 A1* | 8/2015 | Chandra | G06F 11/3684 |
| | | | 717/124 |
| 2016/0147645 A1* | 5/2016 | Kandpal | G06F 11/3672 |
| | | | 717/124 |
| 2016/0364322 A1* | 12/2016 | Sweis | G06F 8/74 |
| 2017/0277625 A1* | 9/2017 | Shtuchkin | G06F 11/3688 |
| 2017/0337122 A1* | 11/2017 | Bolajwar | G06F 11/34 |
| 2018/0039565 A1* | 2/2018 | Rajagopalan | G06F 11/3676 |
| 2018/0121339 A1* | 5/2018 | Mayers | G06F 11/3688 |
| 2018/0173606 A1* | 6/2018 | Malla | G06F 11/3684 |

* cited by examiner

AUTONOMOUS TESTING OF WEB-BASED APPLICATIONS

INTRODUCTION

Aspects of the present disclosure relate generally to software testing and in particular to automating aspects of software testing.

Software applications may be thoroughly tested by developers before release to ensure that end-users have an experience that is as complete and error-free as possible. However, such testing can, depending on the type and specific nature of a software application, be time consuming, expensive and complicated. Simple automation may be employed in some circumstances to lessen some of these problems. For example a script may be employed to test a web-based software application, which may lessen the necessary automation from a human developer.

However, such simple automation may be of limited usefulness. In particular, existing automation solutions may require each and every element of a software application to be predefined before testing in order that a test script can interact with the software application. For example, to automate testing of a web-based software application including forms and fields, each and every form and field in the web-based application may need to be predefined in a testing script so that the testing script can interact with the web-based application. Without predefining all of the forms and fields, the script does not know what elements to interact with for testing purposes. Further, such automation may be limited to predefined test data entries associated with each predefined form or field. The need to predefine the data limits the variety of data that may be practically tested, which consequently limits the range of testing possible for the application via the script. Therefore, systems and methods are needed to facilitate automation of software testing.

BRIEF SUMMARY

Certain embodiments provide a method for autonomously testing a web-based application. The method generally includes an analysis module searching a page of the web-based application for one or more fillable form fields and identifying a fillable form field in the page. The analysis module determines a field type associated with the fillable form field, determines a field data format based on the field type of the fillable form field and generates a test data entry based on the field data format. The analysis module then enters the test data entry into the respective fillable form field and submits the test data entry to a server.

Another embodiment provides a system for autonomously testing a web-based application. The system generally includes a memory including computer executable instructions and a processor configured to execute the computer executable instructions. Executing the computer executable instructions causes the system to search a page of the web-based application for one or more fillable form fields and identify a fillable form field in the page. The processor also causes the system to determine a field type associated with the fillable form field, determine a field data format based on the field type of the fillable form field and generate a test data entry based on the field data format. The processor may then cause the system to enter the test data entry into the respective fillable form field and submit the test data entry to a server.

Still another embodiment provides a non-transitory computer readable medium for autonomously testing a web-based application. The non-transitory computer readable medium generally includes instructions to be executed in a computer system, wherein the instructions when executed in the computer system perform a method for autonomously testing a web-based application. The method generally includes an analysis module searching a page of the web-based application for one or more fillable form fields and identifying a fillable form field in the page. The analysis module determines a field type associated with the fillable form field, determines a field data format based on the field type of the fillable form field and generates a test data entry based on the field data format. The analysis module then enters the test data entry into the respective fillable form field and submits the test data entry to a server.

The following description and the related drawings set forth in detail certain illustrative features of one or more embodiments.

BRIEF DESCRIPTION OF THE DRAWINGS

The appended figures are of certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for autonomous testing of web-based software applications.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Existing methods and processes of automating the testing of software applications, in particular web-based applications, may be limited in usefulness. A software application used to test or automate the testing of other software applications may be called a testing tool. Previous testing tools solve only some problems of manual testing, and introduce several of their own. For example, in order to perform testing on a page of a web-based application, a user must identify for the testing tool all the fields contained on the page, as well as what type of data may be entered into each field. This may need to be done for every form on every page of the web-based application. While this may save some time on the part of an application tester, the application tester may need to update the tool whenever a single form or field in the web-based application is altered. This may occur frequently during certain stages of application development or during the development of certain kinds of applications. Thus, while such tools may theoretically save time assuming a completely static application implementation, in reality the recurrent need to modify the testing script may end up taking as much time or more than simply testing the application manually.

Existing testing tools may need data entered by the application tester to complete fields and forms. It may be desirable to test applications with as many kinds and formats of data as possible to handle different possibilities of use by end-users. However, in order to test with many kinds and formats of data, an application tester needs to manually enter all of the many kinds and formats of data, which may be impractical (or at least inconvenient). Thus, application testing may only be as good as the amount of test data actually entered by the application tester. Further, every time the application changes, the application tester may have to derive new test data for entry, which further compounds the impracticality and inconvenience.

The current disclosure describes systems and methods for autonomous web-based application testing that overcomes the limitations and deficiencies of existing testing tools. In some embodiments, the methods may be performed by an analysis module executing as a process on a testing device, which may identify fields of a web-based form, generate test data to be entered into those fields, and fill in the identified fields using the test data. In some embodiments, the autonomous web-based application testing may iterate or crawl through multiple pages or forms of a web-based application in order to test the entirety of the application rather than just one page or form.

To identify fields of a web-based application, an analysis module may analyze the code underlying the web-based application. For example, the analysis module may analyze hypertext markup language (HTML) code, cascading style sheets (CSS) code, JavaScript, hypertext preprocessor (PHP) code, and the like. For example, HTML code may designate a field as well as field type associated with the field. The field type may be stored in metadata associated with the field. In such cases, the analysis module may be able to identify both fields in a form and field types using the associated metadata. Different types of fields may include name fields, phone number fields, email address fields, physical address fields, unstructured fields (e.g., comment boxes), or other types of fields pertaining to personal information used by the web-based application.

The analysis module may further be able to determine, based on a field type, a field data format of the field. For example, a phone number field may have type "phone number" and may have a field data format that requires only numbers to be entered, or only numbers and special characters, such as parentheses and hyphens (which are frequently used with phone numbers).

After determining the field type and field data format of each field, the analysis module may generate test data entries conforming to the field data format of each field type. These test data entries may be random or pseudo-random, which allows the resultant test data to have a greater variety than would be likely for data entered manually by an application tester. The analysis module may generate test data entries according to a test case or test category. For example, the analysis module may generate test data entries for all fields to simulate data for a hypothetical user. If the hypothetical user is American, the analysis module may generate American test data including, for example, one or more phone numbers formatted in the American standard style. If the hypothetical user is of a different country, the analysis module may generate test data to match the formats of that different country.

After generating test data, the analysis module may enter the generated test data into the fields previously identified in the form. Then, the analysis module may submit the form. Submitting the form may include transmitting the completed form to an application server hosting the web-based application. The analysis module may be further able to determine errors produced by entry of the test data. For example, the analysis module may detect an error message of the page, or may receive an indication of an error or an error message from the application server.

A web-based application may have multiple pages. Autonomous testing of such an application may require the analysis module to navigate through multiple pages. Upon successful submission of a first page, the web-based application may transmit code underlying a second page. After processing through the code of the second page and filling any fields of the second page, the analysis module may submit the second page. Successful submission of the second page may lead to the web-based application transmitting a third application page, and so on.

If an error occurs during submission of a page, however, advancing to a next page may not be possible or practical. If the next page is not received as expected, the analysis module may be able to determine this failure of receipt is an error of submission. This may occur if a certain period of time elapses between submission and non-receipt. The analysis module may also be able to determine an error upon receipt of an error page rather than the expected web-based application page.

Figure 1:
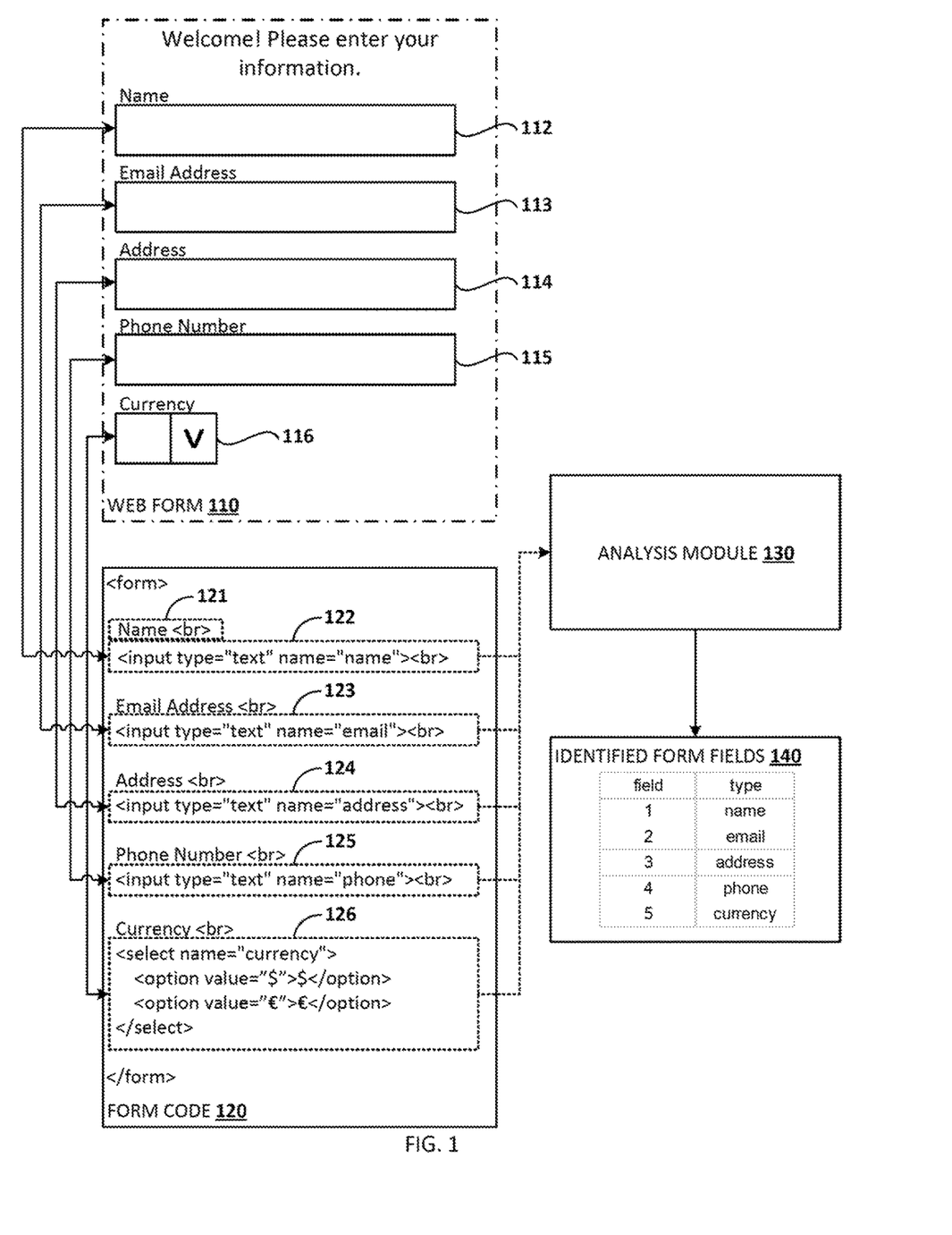
FIG. 1 depicts a simplified example of identifying fields in a form.

FIG. 1 depicts a simplified example of identifying fields in web form 110. Web form 110 is intended to be a simplified section of a page that is part of a web-based application. As illustrated, web form 110 includes a short welcome message, as well as five fillable form fields: a name field 112, an email address field 113, an address field 114, a phone number field 115 and a currency field 116. A fillable form field may be a field of the web-based application that can receive input, that is, be filled, by a user of the web-based application.

While web form 110 represents the visual information displayed to a user, form code 120 represents the computer-readable information defining web form 110. When a software application (such as web-based application) accesses web form 110, the software application may process form code 120 to display web form 110 to a user, for example on a display of an electronic device, such as a computer, smartphone, smart wearable, or the like.

Form code 120 represents simplified HTML code that displays web form 110 to a user when processed by an HTML interpreter (which may also be an Internet browser application). Each fillable form field of web form 110 corresponds to a section of form code 120. For example, name field 112 of web form 110 corresponds to HTML code shown in boxes 121 and 122. Box 121 represents the literal textual value of the "Name" label above name field 112. Box 122 represents HTML code defining name field 112. Boxes 122-126 include code specifying a method of input accepted by the corresponding field. For example, box 122 includes the code (input type="text"), indicating name field 112 accepts text input through a text box. However, other fields may accept other forms of input, such as a selection from a drop-down menu or a selection of a radio button. For example, currency field 126 accepts input in the form of a drop-down menu.

Boxes 122-126 also include code identifying a field type of the field. Box 122 includes the string (name="name"), which serves as an identification for the fillable form field. Such a string, along with other information about a specific aspect of an application which may or may not be displayed to a user of the application, may generally be referred to as metadata. In general, metadata is data that provides information about other data. Different types of metadata exist, including: metadata that describes an element or resource for purposes of identification; metadata that describe types, versions, relationships and other characteristics of data, such indicating how compound objects are put together, for example, how subsets of data are combined to form sets of data; and metadata that provides information to help manage a resource, such as when and how it was created, file type and other technical information. In this example, the identification of the field as a name field, (name="name"), which does not display to the user when the field is displayed in web form 110, is metadata associated with the field. Metadata may come in different varieties than as illustrated. For example, instead of a name of each field, metadata may be a code or other pattern associated with a field type. In other languages besides HTML metadata may take many other forms.

Each fillable form field of web form 110 corresponds to code in form code 120, and each corresponding code segment includes metadata associated with the fillable form field, as illustrated. For example, box 123 corresponds to email address field 113 and contains metadata identifying email address field 113 (name="email"). Box 124 corresponds to address field 114. Box 125 corresponds to phone number field 115. Box 126 corresponds to currency field 116, which is shown implemented as a drop-down menu. Box 126 contains metadata identifying currency field 126 (name="currency"), as well as data specifying the possible options of the drop-down menu.

Analysis module 130 is able to identify the fields in web form 110 using form code 120. In particular, analysis module 130 may access metadata of form code 120 to identify individual fields. In this example, analysis module 130 uses metadata of form code 120 to identify the fields of web form 110 as being a particular field type. For example, analysis module 130 may access the metadata for each field, in boxes 122-126, to identify the fields of web form 110 as a name field, an email address field, an address field, a phone number field and a currency field, respectively, as shown in identified form fields 140.

When identifying the form fields of web form 110, analysis module 130 is able to associate identified form fields 140 with the specific page that includes the form fields. So, for example, when processing a first page of a web-based application, analysis module 130 is able to associate identified form fields 140 with the first page. Then, when processing subsequent pages of the web-based application, analysis module 130 is able to determine correlations between fields of the first page and subsequent pages. For example, some related information may be broken up across pages. One page that requires input of a state of residence for US users could be followed by a different page that requires a zip code for US users. If so the web-based application may require that the state of residence and the zip code agree to proceed in the web-based application. Analysis module 130 can generate data that agrees with (or intentionally disagrees with) such data requirements, by accessing previously processed fields from earlier forms.

Fillable form fields may be configured to accept a specific format of data, referred to as a field data format. After identifying a field type of a fillable form field, analysis module 130 determines a field data format for the form field based on the field type. For example, if analysis module 130 uses the metadata of box 122 to identify the corresponding field as a name field, then analysis module 130 can determine an appropriate field data format for the name field, such as a string of alphabetic characters starting with a capitalized first letter for names in certain languages like English. Non-alphabetic characters may be allowable in a field data format for names in languages that do not use alphabets, such as varieties of Chinese.

By autonomously identifying types and formats of fillable form fields, analysis module 130 avoids one limitation of existing testing tools; namely: requiring an application tester to either manually enter test data in each form field of a web-based application, or predefining each and every field of a web-based application page for purposes of using a script.

As analysis module 130 may identify forms previously unknown to analysis module 130, new pages can be tested without adjustment made to or input provided to analysis module 130. Further, single fields may be added, removed or altered without effecting the testing of existing pages.

Figure 2:
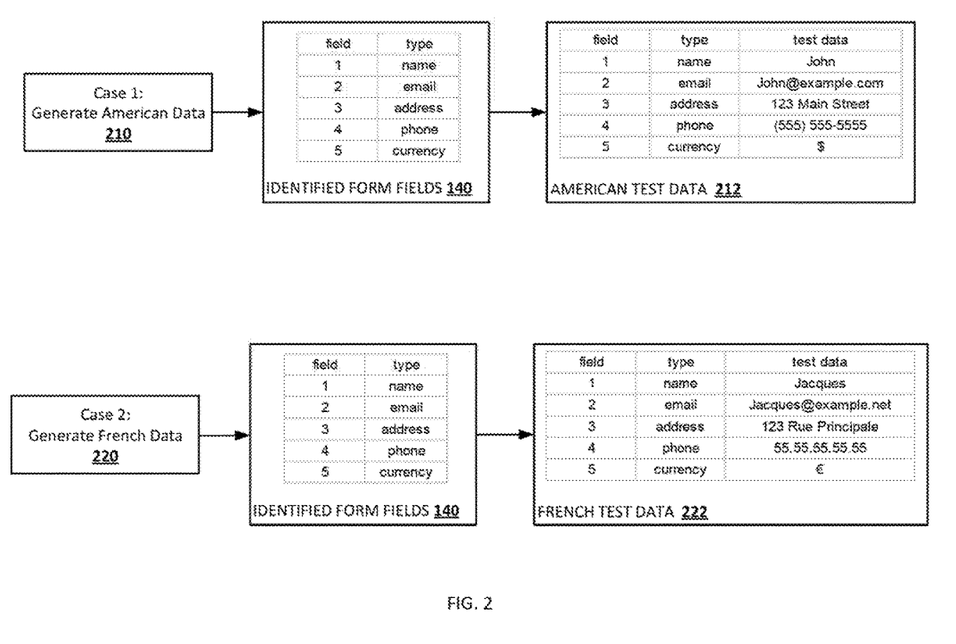
FIG. 2 depicts simplified examples of generating test data.

FIG. 2 depicts examples of generating case-specific test data 212 and 222. An analysis module, such as analysis module 130 of FIG. 1, may take identified form fields 140 and may generate test data entries corresponding to each field. Test data entries may correspond to, for example, different types of hypothetical users or use cases. FIG. 2 depicts two example test cases related to two types of hypothetical user: American test data 212 (i.e., a first test case), and French test data 222 (i.e., a second test case). As illustrated, identified form fields 140 includes five fields and an identifier for each. Field 1 is a name field, field 2 is an email address field, field 3 is an address field, field 4 is a phone number field and field 5 is a currency field. Other types of test cases are possible, including other languages or nationalities. For a tax software application, for example, other test cases may include married users, single users, large businesses, small businesses, or tax-exempt entities, to name a few possibilities. In this example, each test case (212 and 222) includes test data for each identified form field;

however, in other test cases, identified forms may be intentionally left blank in order to test the application's response to missing data.

Test data cases may be based on a user type. For example, American test data 212 is based on a hypothetical American user. As such, American test data 212 complies with American data formats. For example, American test data 212 includes an American format phone number, (555) 555-5555 in field 4. Similarly, French test data 222 is based on a hypothetical French user and complies with French data formats. For example, French test data 222 includes a French format phone number, 55.55.55.55.55, corresponding to field 4.

The entries shown in American test data 212 and French test data 222 are intended to be illustrative and not exclusive. To ensure greater variety in the produced data, each time data is generated for a certain case it may be different. That is, in the occurrence illustrated, the analysis module produced data for a hypothetical American user including the name "John" and the address "123 Main Street". On a different occurrence, the analysis module may produce other data for a different hypothetical American user, which may include different entries, like the name "Jane" or the address "456 First Avenue". However, certain information, like currency, may typically be generated the same for all hypothetical users of a given nationality. For example, all hypothetical American users may be given "$" as a currency. As above, in some instances test cases may be generated pseudo-randomly by randomly selecting test data entries (e.g., names, numbers, etc.) from a database storing such test data. In this way, the test cases may vary despite reusing certain test data. For example, in one test case, the name "John" and the address "123 Main Street" could be randomly selected from a database of test entries.

In some cases, test data may be generated randomly, but concatenated with a particular prefix or suffix. In the example of American test data 212, a prefix such as AJ (standing for "American John") may be generated. Then, that prefix can be concatenated to each entry. Thus, "John" becomes "AJ-John," "123 Main Street" becomes "AJ-123 Main Street" and so on. Such prefixes may be useful for tracking different test cases, for example, related to different types of users or different use cases.

The analysis module may be able to generate test data entries using a variety of character sets. For example, while English and French use similar alphabets, they are not exactly the same. Thus, the analysis module may generate test data entries containing characters appearing in the French alphabet that do not appear in the English alphabet when producing French test data 222, and vice versa when producing American test data 212. The analysis module can also generate test data entries containing characters of entirely different alphabets, such as the Cyrillic alphabet or the Greek alphabet, if producing data for a hypothetical Russian user or a hypothetical Greek user, respectively. This may allow the analysis module to test data of many languages. Testing data of different languages is useful in ensuring the web-based application being tested functions properly for different types of users, for example in different countries where a web-based application is deployed.

A field with a field type of "phone number" accepts a number of digits spaced or separated based on a particular number pattern of a country. For example, phone numbers in the United States are typically represented as three digits comprising an area code surrounded by parentheses, followed by seven digits, the third and fourth digits separated by a hyphen, like the phone number shown in American test data 212. A "phone number" field may accept a United States phone number of this format, but may also accept the same number formatted instead as ten non-separated digits. Likewise, a French phone number is typically formatted as five sets of two digits separated by periods, as shown in French test data 222. A "phone number" field may accept French phone numbers in this format or formatted as ten non-separated digits.

By autonomously generating test data for fillable form fields, at least two improvements are realized. First, the time and effort associated with an application tester manually generating test data for each and every field of every page of a web-based application is avoided. Second, the variety of test data generated autonomously will be much greater than that generated by an application tester with a limited imagination. Thus, the time and effort necessary to test an application is reduced, and the robustness of the testing is increased.

Figure 3:
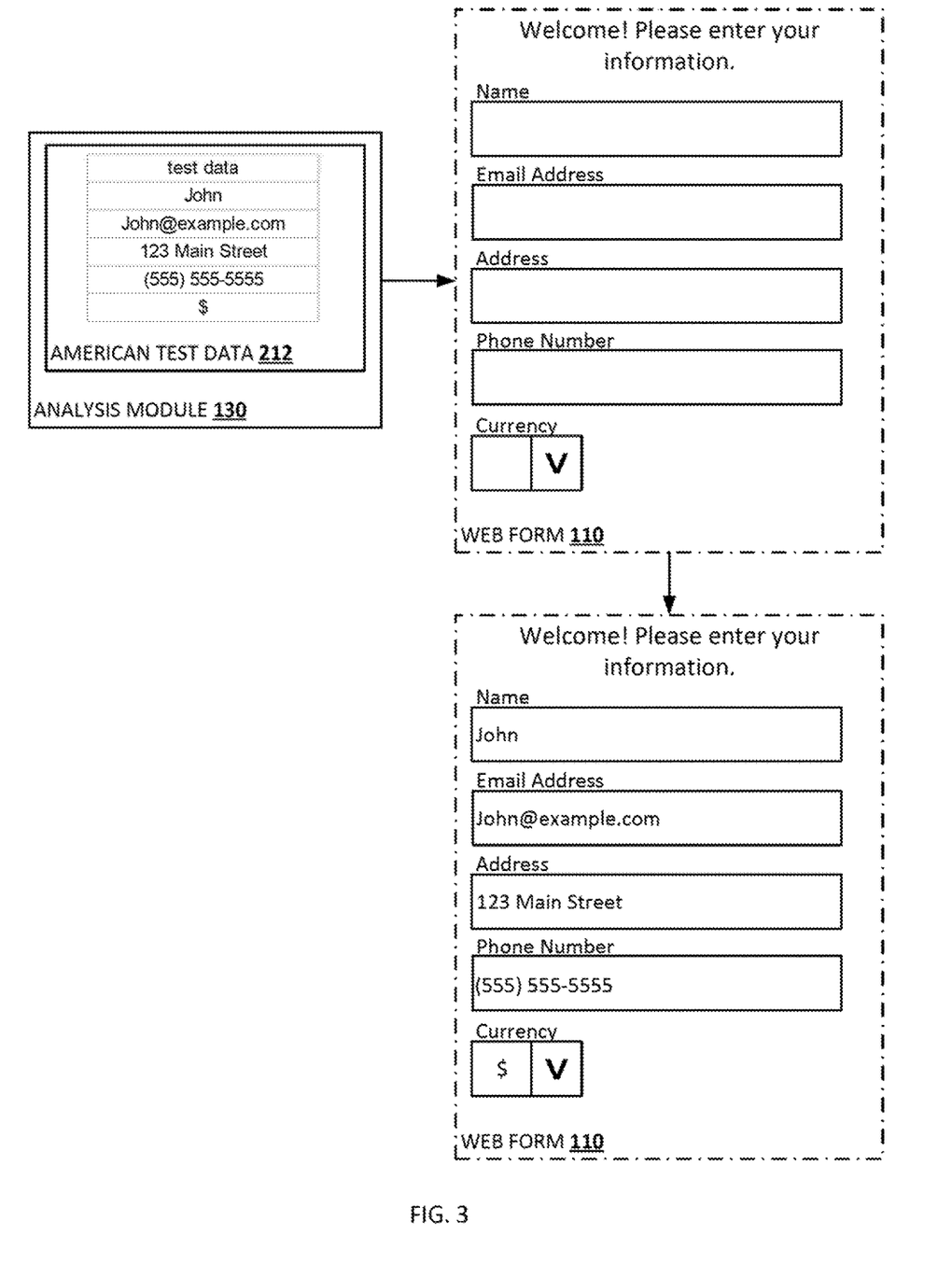
FIG. 3 depicts a simplified example of populating fields with test data.

FIG. 3 depicts a simplified example of populating fields of web form 110 with test data. In this example, American test data 212 is used to populate the fields of web form 110. To populate the fields of web form 110, analysis module 130 accesses the fields of web form 110 and enters American test data 212. Although shown as being filled by American test data 212, the fields of web form 110 may be filled by any generated test data, such as French test data 222 of FIG. 2 or any other generated test data that complies with the field data formats of the five fillable form fields. After populating the fields of web form 110, analysis module 130 submits web form 110. In addition to submitting the entirety of web form 110, single fields may also be submitted. This may be the case for certain web-based applications which automatically process data entered into a field before a literal submission of the page.

Populating fields may entail different actions to fill different types of form fields. For example, text input fields require the input of a string of characters; drop-down menu fields require one option of the drop-down menu to be selected; radio button fields require a radio button to be selected; etc. Populating fields may also be order-dependent. For example, certain dependent fields may not appear until a preceding field is entered. For example, a country field may need to be filled as United States before a dependent state field appears, because a different dependent field appears if a different country is selected. For example, selecting Canada as the country leads to a dependent province field appearing rather than the dependent state field. If a dependent field is in a form, analysis module 130 may have to iterate through identification of fields, generation of data and entry of data multiple times for a single form. Following from the same example, identification of a country field leads to generation of country data. Entry of country data causes a dependent state field to appear in the form, which is then also identified. After identification, state data is generated for the dependent state field, and state data is entered into the dependent state field.

Figure 4:
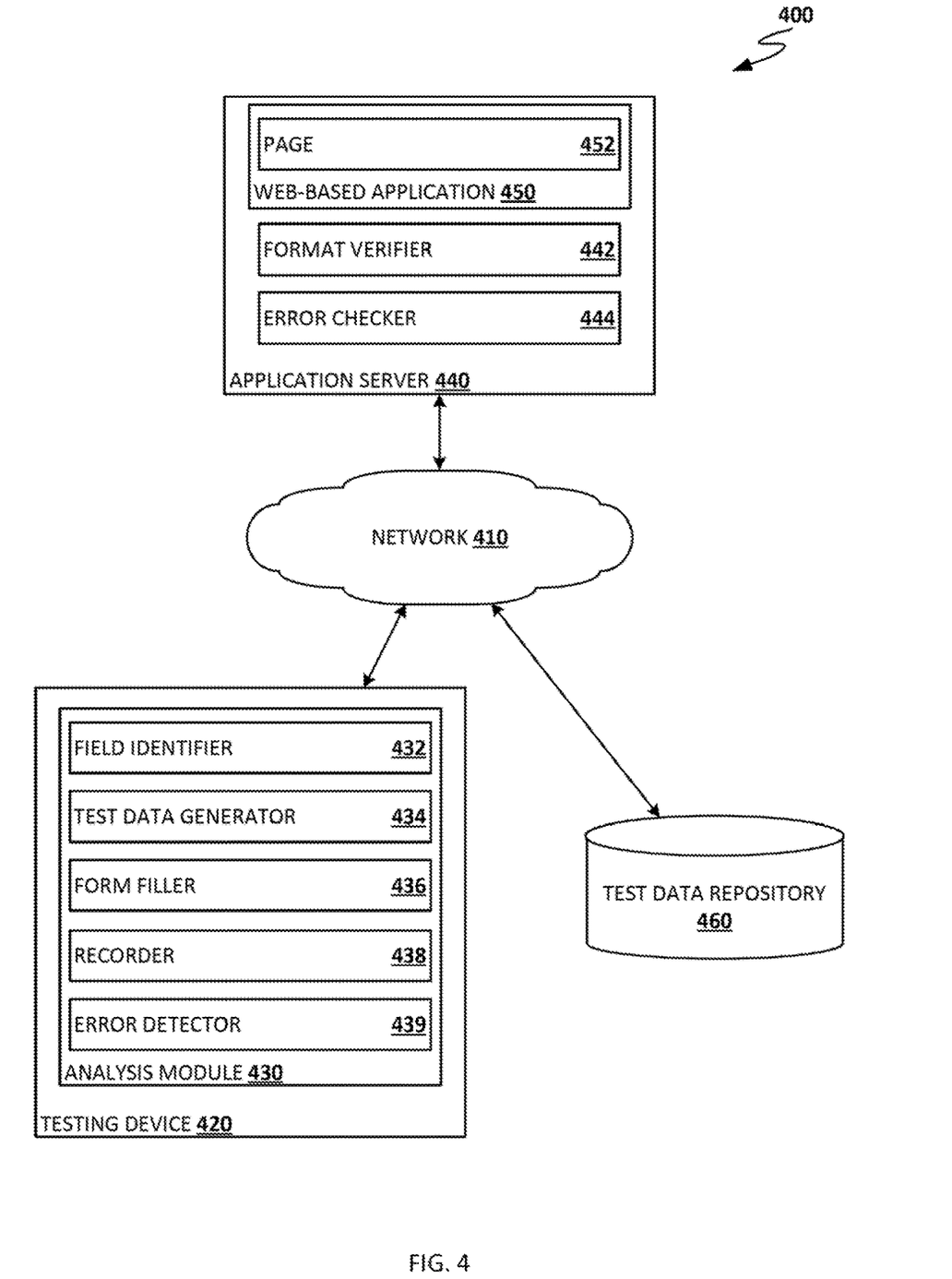
FIG. 4 shows an exemplary computing environment for communication between a testing device and an application server.

FIG. 4 shows an exemplary computing environment 400 for communication between testing device 420 and application server 440. As illustrated, testing device 420, application server 440, and test data repository 460 communicate over network 410.

Testing device 420 is a computing device. Testing device 420 includes analysis module 430, which may correspond to analysis module 130 of FIG. 1. Analysis module 430 is a software application executing on the hardware of testing device 420. Testing device 420 may be operated by an application tester, and is used to locate and identify programming bugs or other errors in web-based application 450 hosted by application server 440.

Analysis module 430 includes field identifier 432, test data generator 434, form filler 436, recorder 438, and error detector 439. Field identifier 432 is configured to determine fields in a form in a web-based application. Field identifier 432 accesses metadata associated with the form or with the fields to identify a field type of a particular field. Field identifier 432 also determines a field data format for the particular field, based on the field type.

Test data generator 434 is used in particular to generate test data for the fields. As discussed above, test data generator 434 may generate random test data or pseudo-random test data, or may use specific test data, e.g., retrieved from a test data repository. Each entry of test data generated by data generator 434 complies with the field type and the field data format of the particular field. Form filler 436 interacts with a web-based application in order to fill or populate fields with the test data generated by data generator 434.

Analysis module 430 is also capable of recording video or taking screenshots of web-based application 450 during testing, to better track and identify errors. For example, recorder 438 may be configured to take a first screenshot of a page of a web-based application before test data is entered, a second screenshot of the page after the test data is entered, and a third screenshot after the test data is submitted. The first screenshot may capture, for example, errors in the rendering of various form fields on a page. The second screenshot may capture, for example, errors in the way entered test data is displayed, formatted, etc. (e.g., if a form field area is too short to display the entered data). The third screen shot may capture, for example, an error message or other unexpected event after the test data is submitted (e.g., an error in the handling of the test data). In some cases, analysis module 430 may be configured to analyze data returned from web-based application 450 to determine an error. For example, if application server 440 returns a "404 Error: Page Not Found", then analysis module 430 uses error detector 439 to determine that an error has occurred.

Application server 440 includes web-based application 450, format verifier 442 and error checker 444. Application server 440 hosts web-based application 450 for use by other devices (not shown). Testing device 420 accesses web-based application 450 via application server 440 in order to locate or identify errors in web-based application 450. As illustrated, web-based application 450 includes page 452, which itself may include a plurality of forms and respective fields associated with the forms.

Format verifier 442 verifies the data generated by analysis module 430 and received by application server 440. For example, format verifier 442 is able to determine that test data entered into a name field complies with the formatting requirements of the name field. If a formatting error is determined, format verifier 442 may send the determined formatting error to error checker 444, or may prevent submission of page 452.

Error checker 444 detects errors occurring in web-based application 450. For example, error checker 444 may detect when test data does not conform to a requirement of web-based application 450 or may detect when an error occurs regardless of the form of test data. Error checker 444 may, in some examples, be configured to send an indication (e.g., a message to testing device 420 upon detecting such an error. Error checker 444 also stores in repository (e.g., a local or remote data store) information associated with detected errors.

Test data repository 460 is accessed by analysis module 430, over network 410, to store and/or retrieve generated test data. Data can be stored and later retrieved in order to re-use generated test data if needed to replicate an error. Data may also be stored and later retrieved to match input of one field with input required by a field of a later page in the web-based application. Data may also be stored and retrieved to avoid regenerating test data, if new data is not required for a particular testing situation.

To autonomously test web-based application 450, analysis module 430 first requests, via network 410, page 452 of web-based application 450 from application server 440. Application server 440 responds, via network 410, with code defining page 452, which may be in the form of an HTML document. Field identifier 432 processes the code defining page 452 in order to identify fields within page 452. Data generator 434 then generates test data entries to fill the identified fields, and form filler 436 populates the fields of page 452 with these test data entries. Then, analysis module 430 may submit page 452 filled with the test data entries to application server 440, via network 410. A user of testing device 420 may also submit page 452 to application server 440.

Once received by application server 440, page 452 is verified to have the correct format by format verifier 442. Then, application server 440 processes page 452 as part of the normal operation of web-based application 450. If page 452 processes normally, application server 440 may transmit to analysis module 430 a different page of web-based application 450. For example, if web-based application is an ordered sequence of HTML pages, application server 440 transmits a next page in the sequence after page 452. If page 452 does not process normally, error checker 444 detects the abnormal processing and transmits an error report over network 410 to analysis module 430. A user of testing device 420 may then review the error report. Alternatively, analysis module 430 may also forward the error report to a testing administrator. Further, in some cases, analysis module 430 may determine that an error has occurred if it receives an error indication from the web-based application or if it fails to receive expected data, such as another HTML page. For example, if the submitted test data causes web-based application 450 to stall or crash, analysis module 430 may determine after a threshold period of time of not receiving expected (or any) data that an error has occurred.

Figure 5:
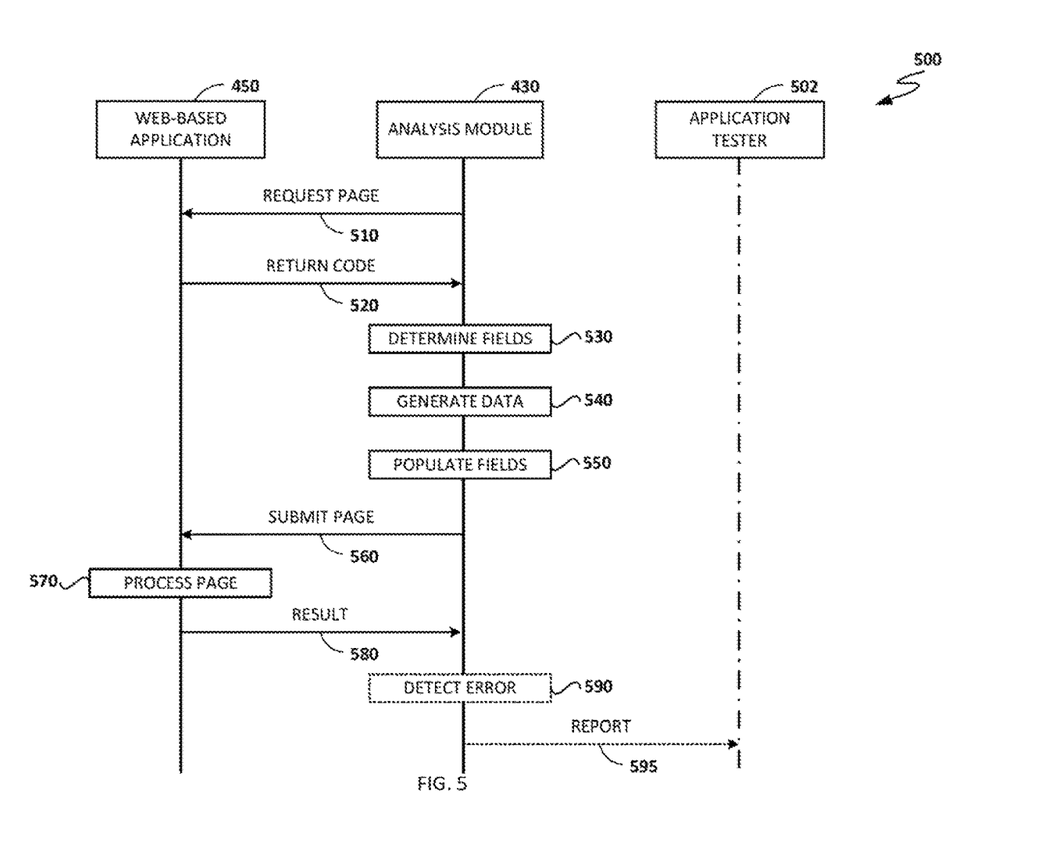
FIG. 5 depicts a call-flow diagram of communication between a testing device and an application server.

FIG. 5 illustrates a call-flow diagram of a process 500 in which fields of a form in a web-based application are autonomously populated. As illustrated, the process involves web-based application 450, analysis module 430 and application tester 502. An application server, such as application server 440 of FIG. 4, may host web-based application 450 including a plurality of pages, each page possibly including a number of forms and fields. A testing device, such as testing device 420 of FIG. 4, may execute analysis module 430, which may interact with pages and forms of the web-based application.

Process 500 may begin at transmission 510, where analysis module 430 requests a page from web-based application 450. Such a request may be a typical network request, such as a Transmission Control Protocol or Internet Protocol (TCP/IP) request for an HTML document. The request may include a uniform resource locator (URL).

At transmission 520, web-based application 450 returns code to analysis module 430. This code defines a page of a web-based application comprising a form and fields, and may be an HTML document.

At block 530 analysis module 430 determines the fields defined by the code provided by web-based application 450 in transmission 520. Determining the fields typically includes analyzing metadata within the code to determine a field type for one or more field, and determining a field data format corresponding to that field type. For example, metadata associated with a field may identify it as a name field, and name fields may accept strings of alphabetic characters as input.

At block 540 analysis module 430 generates test data entries for the fields determined in block 530. For example, test data entries may be generated using a pseudo-random data generator. Data may be generated to simulate a hypothetical user type, for example a user from a particular country.

At block 550 analysis module 430 populates the fields of the form using the data generated at block 540. The analysis module accesses a locally stored version of the form (i.e., the code received in transmission 520) to enter the test data entries.

At transmission 560 analysis module 430 submits the completed page (i.e., including the test data entries) to web-based application 450. This submission may be initiated by the analysis module automatically or by a user the testing device executing analysis module 430, such as an application tester (e.g., in a case where an application tester wants to step through the test).

At block 570, web-based application 450 processes the submitted page. Such processing may include validating the contents and formatting of the form and fields of the page. Processing may also include determining errors in the page or errors in the submission.

At transmission 580 web-based application 450 returns a result of the submission to analysis module 430. Such a result may indicate success of the submission or an error in attempting to submit.

At block 590 analysis module 430 detects an error if an error has occurred. Such an error may indicate that the web-based application contains a programming bug or another type of error. As discussed above, analysis module 430 operates autonomously, and is capable of recording a video and or screenshots depicting the process above, which may later be reviewed by an application tester or another user. Thus, the application tester's time may be spent effectively by reviewing detected errors rather than by running the test process itself.

If an error is detected at block 590, at transmission 595 analysis module 430 transmits an error report to application tester 502. Application tester 502 may be a testing coordinator or manager responsible for compiling and tracking errors found by testing devices, or may be a user of the testing device executing analysis module 430.

Figure 6:
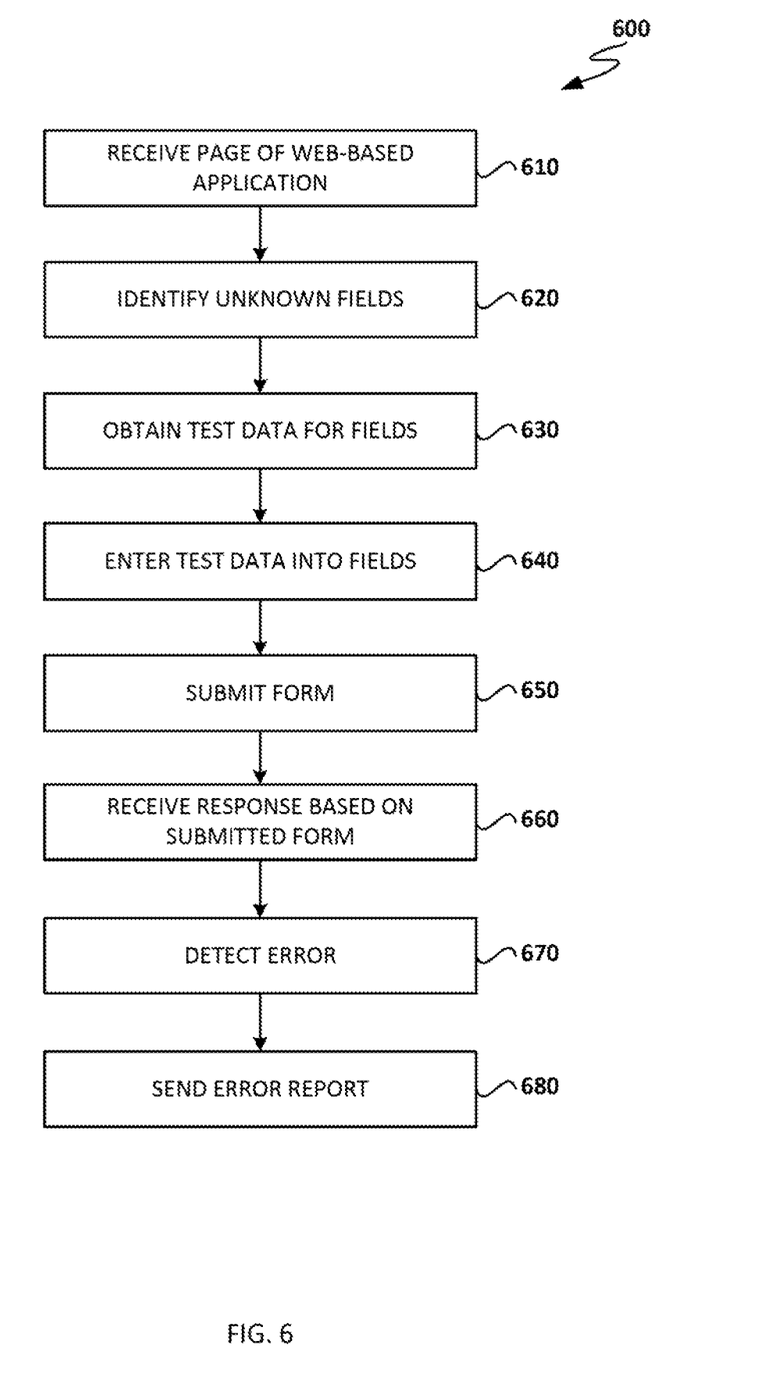
FIG. 6 depicts exemplary operations for autonomous testing of a web-based application.

FIG. 6 illustrates exemplary operations 600 for autonomous testing of a web-based application, which may be performed by an analysis module, such as analysis module 130 of FIG. 1 and 430 of FIG. 4. Operations 600 begin at step 610, where a page of a web-based application is received by the analysis module. The page may include a form and a number of unknown fillable form fields. While the fields of a form may be readily identifiable by a human user of the web-based application, the fields of a form are typically not identified by software applications that process pages of web-based application.

At step 620, the plurality of unknown fields are identified. This may be done by analyzing metadata associated with the plurality of unknown fields. Examples of fields include name fields, email address fields and phone number fields.

Fields may accept input in a variety of ways, for example including text input or a selection from a drop-down menu. The analysis module can identify any number of fillable form fields in a form. For example, if during application development a new field is added to a form, the analysis module can identify this newly added field automatically (i.e., without direct user intervention. Conversely, if a field has been removed, the analysis module can determine that a field has been removed from the form.

At step 630, test data for the identified fields is obtained. Test data may be generated randomly, pseudo-randomly, or the test data may be purposefully selected. Test data may also be obtained from a test data repository. Test data may comply with requirements of the identified form fields. For example, a name field may accept test data of a string of alphabetic characters. Test data may be generated randomly, pseudo-randomly (e.g., randomly selecting test data from a database of test cases), or test data may be purposefully selected (e.g., to test a particular case). In some examples, the analysis module may have a setting or parameter which adjusts the type of test data to generate (e.g., randomly, pseudo-randomly, or otherwise), or the analysis module may be configured to sequentially test different types of test data.

At step 640, the test data in entered into the identified fields. Entry of test data may be performed autonomously, that is, without user interaction. Entry of test data may include a variety of specific actions depending on the type of field. As examples, a text field may be filled with a string of text, a drop-down menu field may have one of the options of the drop-down menu selected, or a radio button field may have one of the radio buttons selected. Entry of test data generally includes the analysis module simulating one or more input devices, such as a simulated mouse or a simulated keyboard.

At step 650 the form identified in step 610 is submitted. The form may be submitted to the web-based application. Submission will typically be over a network and may pass through a number of devices along the way, including a testing device executing the analysis module or an application server hosting the web-based application. Submission of a form may be prevented in some cases by real-time processing of fields. For example, some forms include locally-executing instructions which process data input to a field as it is input. For such a form, submission may not be possible unless all data is already formatted correctly or all fields are completely filled in.

At step 660 a response is received based on the form. The response may be caused by processing performed by the web-based application and may indicate a success or failure of the submission. For example, if the form processes successfully, a next page in the web-based application may be included with the response. If the form does not process successfully, the response may instead include an error report or error page. In some cases, unsuccessful processing may prevent a response from being sent. In such a case, the analysis module can determine after a certain period of time that no response is forthcoming and proceed in operations 600.

At step 670 an error is detected in the response. The error may indicate that the web-based application contains a bug or other programming error. Finding such errors may be the goal of application testing, as detecting errors leads to developers being able to correct those errors. An error may be detected by receipt of an error page from the web-based application, or by a failure to receive anything from the web-based application after a certain period of time, as mentioned above. The later type of error is referred to as a timeout error.

At step 680 an error report is sent. The error report is generated based on the error detected at step 670, and information related to the error. The error report may be sent to a testing administrator or other administrator of a computing network. The error report may also be made available to an application tester or other user of the analysis module. The error report may include screenshots or videos recorded by the analysis module to document the error causing the error report. If made available to the application tester, it may be made available through a graphical user interface of the analysis module and displayed on a display of the testing device. The error report may also be added to a cumulative error log which records all instances of errors for the web-based application.

Figure 7:
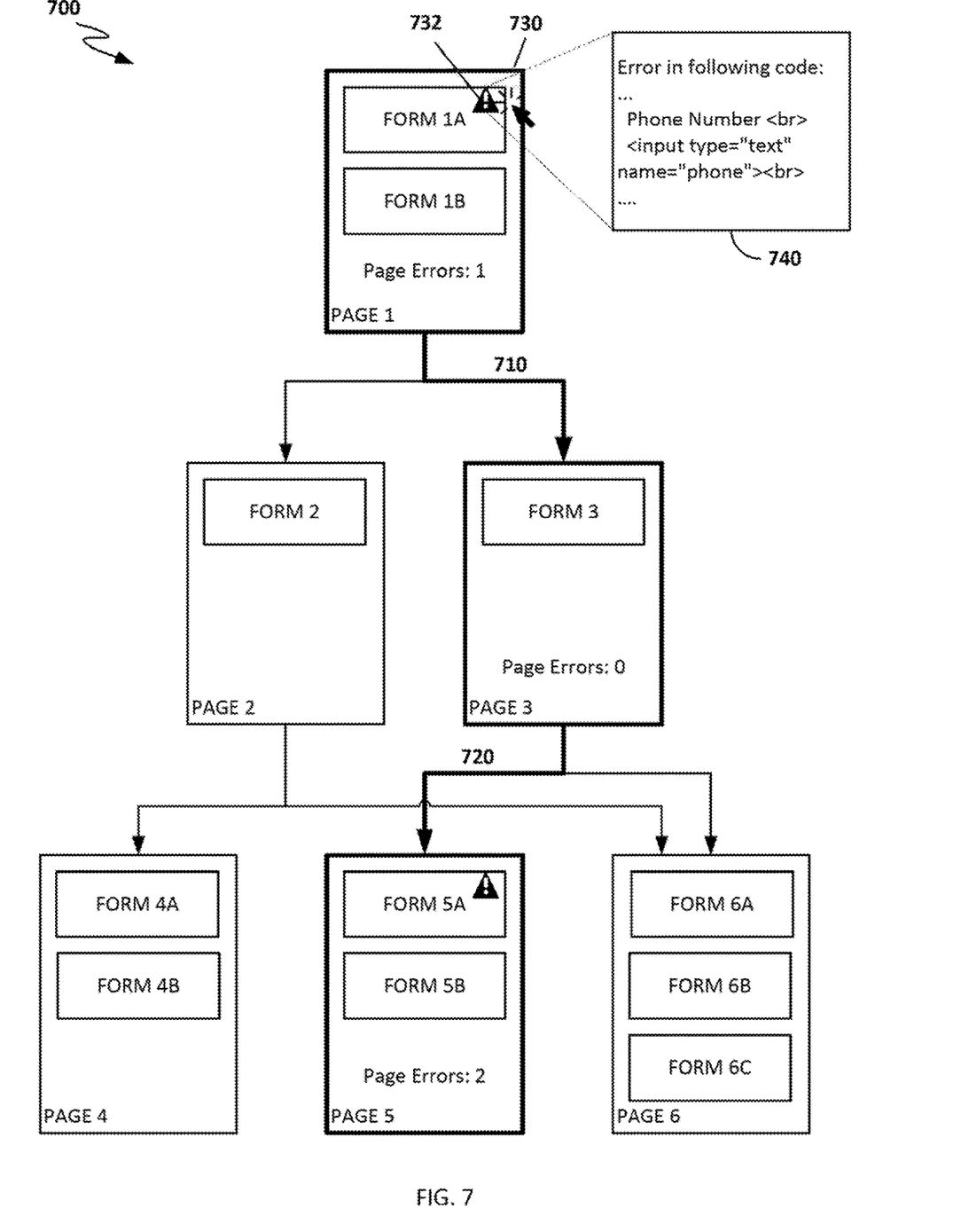
FIG. 7 depicts a simplified example of path navigation within a web-based application.

FIG. 7 illustrates an example of path navigation within a web-based application 700. As above, a web-based application may include a plurality of pages, which may in-turn include one or more forms of fillable form fields.

The web-based application in FIG. 7 includes pages 1-6, which each include one or more forms. Note that while all pages in this example web-based application include forms, other web-based applications may have pages that do not have forms. Arrows between pages of the web-based application indicate that the web-based application may advance from the source page of the arrow to the destination page of the arrow. A path through a web-based application is a series of pages that are processed through from beginning to end for a specific running of the web-based application.

As depicted generally in FIG. 7, a user may take different paths through a web-based application. For example, one path is highlighted by the bolded arrows from Page 1, to Page 3, and then to Page 5 via transitions 710 and 720. In some examples, a path through a web-based application may be referred to as a "use case" or a "user case." It is also evident based on the example path through web-based application 700 that not all pages are necessarily shown to a user as the user navigates the web-based application. Generally, the web-based application processes data entered into the forms (e.g., by a user) of a page and determines which page to advance to next. For example, because advancing pages is determined by user input, some users of the illustrated web-based application may be sent page 2, while other users are sent page 3.

In order to properly test the web-based application, all possible pages of the web-base application must be tested. An analysis module, such as that described with respect to FIGS. 1 and 3-5, may be able to determine all possible paths through a web-based application by entering different test data into different forms. Certain input may be needed at certain fields of the web-based application for a given path to be navigated, so the analysis module may be able to generate data for the certain fields in a way to ensure the given path is followed. For example, a drop-down menu field in form 1A may determine whether page 2 or page 3 is displayed following page 1.

In some cases, an analysis module may not have a priori knowledge of the structure of a web-based application (e.g., all the paths through the app), so the analysis module may continue testing different data in each form until a threshold confidence level is reached that all paths have been traversed. For example, if after a certain number of random evolutions of test data no new pages have been discovered, the analysis module may determine that it has "mapped" the web-based application completely. In some cases, an analysis module may create a visual representation of a web-based application, such as that shown in FIG. 7, which depicts pages, paths, forms, errors associated with pages, and other data. In some cases, such a visual representation may assist an application tester (human) in determining if the analysis module has indeed tested each and every page, and if it has not, it may indicate to the application tester that there is an issue with a particular page (e.g., a page from which another connected page is never reached).

Web-based application functionality may be implemented by a series of plug-ins to a web-based application that may be reusable between different web-based applications. Plug-ins may be one or more pages of a web-based application, and all pages of a given plug-in must be tested to fully test the plug-in. Thus, a possible path through a web-based application may be predefined to include all the pages of a given plug-in. For example, a web-based application featuring a payment system may include a payment system plug-in that defines and represents the entirety of the payment system across multiple pages. Turning back to the example in FIG. 7, if page 2 and page 4 represent a payment system, a path including both page 2 and page 4 must be tested to fully test implementation of the payment system plug-in.

Though not shown explicitly in FIG. 7, navigation of a web-based application may include navigation of forms within a page (intra-page navigation) in addition to navigation between pages (inter-page navigation). For example, certain data entered into form 1A may cause the web-based application to advance to page 2 immediately, while other data entered into form 1A may cause the web-based application to advance to form 1B. The analysis module may also be able to determine all possible paths through a single page of a web-based application.

An analysis module may detect errors in different pages (e.g., in forms associated with a page) while navigating various paths of a web-based application. The analysis module may track errors both cumulatively for the path as well as individually for each page of the path. For example, along the path defined by arrows 710 and 720, page 1 encountered an error in form 1A, indicated by warning symbol 750.

In some embodiments, a graphical user interface associated with the analysis module may displays text and other indications (e.g., icons) indicating that an error has been encountered. For example, Page 3 includes text indicating that no errors have been encountered on that page. Page 5 encountered two errors in form 5A. The graphical depiction thus includes text indicating that two errors have been encountered.

In some examples, the graphical user interface associated with the analysis module may display interactive elements, such as warning icon 750 in Form 1A. When a user clicks on warning icon 750 (or alternatively on Form 1A), the graphical user interface displays a more detailed description of the error encountered, as depicted in box 740. In this example, the more detailed description includes an identification of the exact form field in Form 1A that caused the error by way of displaying the related code. Thus, the graphical user interface associated with the analysis module may enable an application tester (human) to quickly locate errors without detailed review of, for example, log files, etc.

Figure 8:
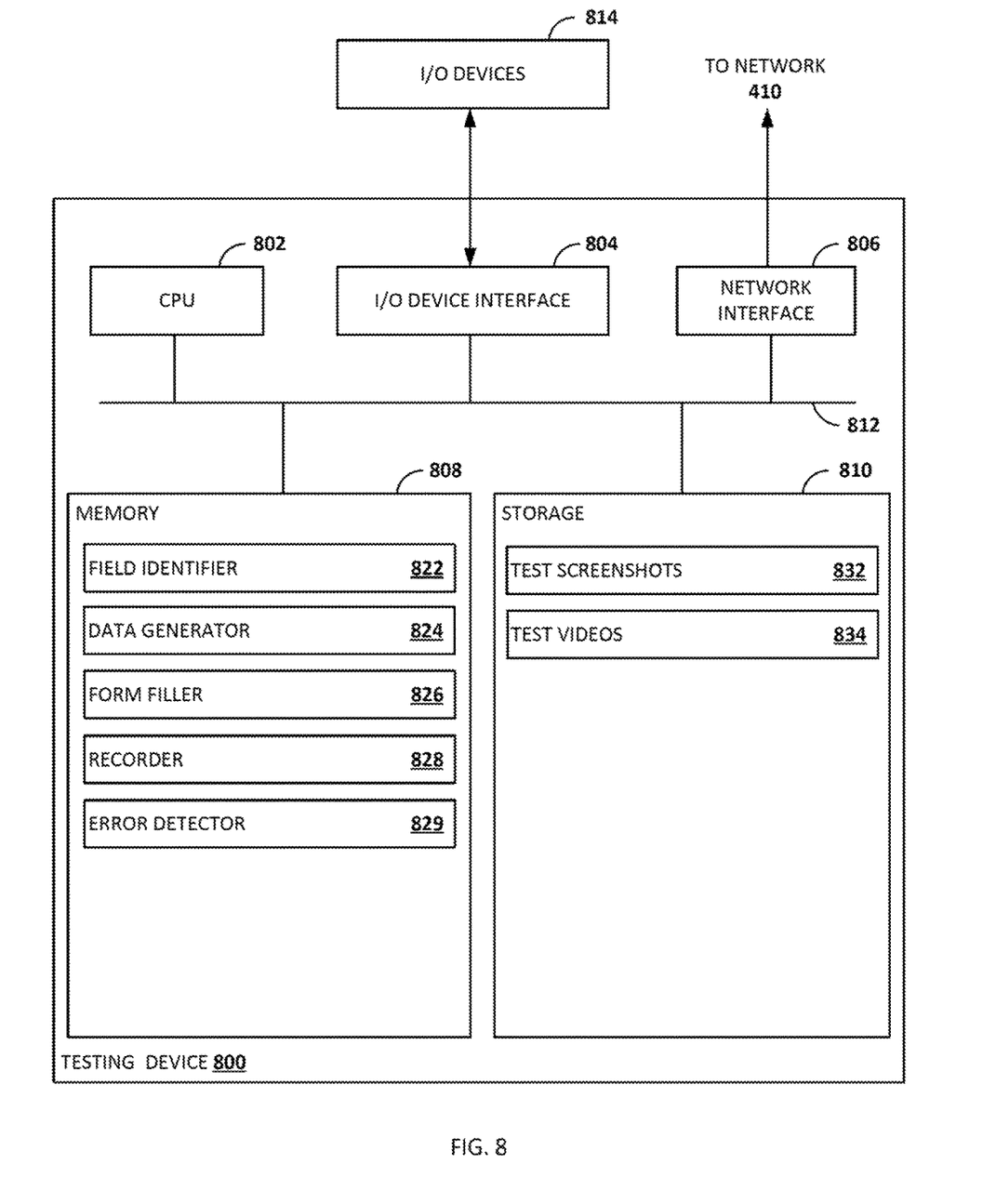
FIG. 8 depicts an exemplary testing device.

FIG. 8 illustrates an exemplary testing device 800, such as testing device 430 of FIG. 4. As shown, testing device 800 includes a central processing unit (CPU) 802, one or more input/output (I/O) device interfaces 804, which may allow for the connection of various I/O devices 814 (e.g., keyboards, displays, mouse devices, pen input, etc.) to testing device 800, a network interface 806, a memory 808, a storage 810, and an interconnect 812.

CPU 802 may retrieve and execute programming instructions stored in memory 808. Similarly, CPU 802 may retrieve and store application data residing in memory 808. Interconnect 812 transmits programming instructions and application data, among CPU 802, I/O device interface 804, network interface 806, memory 808, and storage 810. CPU 802 is included to be representative of a single CPU, multiple CPUs, a single CPU having multiple processing cores, and the like. I/O device interface 804 may provide an interface for capturing data from one or more input devices integrated into or connected to consumer device 800, such as keyboards, mice, touchscreens, and so on. Memory 808 may represent a random access memory (RAM), while storage 810 may be a solid state drive, for example. Although shown as a single unit, storage 810 may be a combination of fixed and/or removable storage devices, such as fixed drives, removable memory cards, network attached storage (NAS), or cloud-based storage.

As shown, memory 808 includes field identifier 822, data generator 824, form filler 826, recorder 828 and error detector 829 such as described above with respect to FIGS. 4-6.

As shown, storage 810 includes test screenshots 832 and test videos 834. Test screenshots 834 and test videos 836 may be created by recorder 828 in response to detecting an error in a submitted form. Videos and screenshots may be created based on a display of a screen of testing device 800, which may be an output device of I/O devices 814.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method for autonomously testing web-based applications, comprising:
   receiving a request to execute a path through a web-based application comprising a set of pages, wherein the path includes all pages of the set of pages associated with a plug-in of the web-based application;
   receiving a page of the set of pages from a server of the web-based application;
   searching the page of the web-based application for one or more fillable form fields;
   identifying a fillable form field in the page;
   determining a field type associated with the fillable form field;
   determining a field data format based on the field type of the fillable form field;
   generating a first test data entry including at least one non-numeric text string based on the field data format and a nationality of a hypothetical user associated with a test case, wherein the first test data entry causes the web-based application to advance along the path when submitted to the server;
   entering the first test data entry into the fillable form field;
   submitting the page and the first test data entry to the server;
   receiving, from the server, a next page of the set of pages wherein the next page is within the path through the web-based application; and
   until a threshold confidence level that all paths in the web-based application have been traversed is reached;
      generating a plurality of second test data entries, each of the plurality of second test data entries causing the web-based application to advance along a random path in the web-based application,
      entering the plurality of second test data entries into the fillable form field,
      submitting the page and each of the plurality of second test data entries to the server,
      receiving, from the server, a subsequent page of the set of pages is the random path through the web-based application, and
      determining that the threshold confidence level has been reached based on whether no new pages in the web-based application have been discovered for a threshold number of second test data entries.

2. The method of claim 1, further comprising: determining an error associated with the identified fillable form field of the page.

3. The method of claim 2, wherein determining an error associated with the fillable form field comprises: receiving an indication from the server of an error associated with the fillable form field of the page.

4. The method of claim 1, further comprising:
   after entering the first test data entry into the fillable form field, determining the fillable form field is associated with a dependent field;
   determining a dependent field type associated with the dependent field;
   determining a dependent data format based on the dependent field type of the dependent field;
   generating a dependent test data entry based on the dependent data format; and
   entering the dependent test data entry into the dependent field.

5. The method of claim 1, wherein determining a field type associated with the fillable form field further comprises: identifying metadata associated with the fillable form field.

6. The method of claim 5, wherein the metadata comprises a hypertext markup language (HTML) tag.

7. The method of claim 2, further comprising: capturing an image of the page in response to determining the error.

8. The method of claim 2, further comprising: capturing a video of the page in response to determining the error.

9. The method of claim 1, wherein generating a test data entry based on the field data format further comprises concatenating a prefix to the test data entry, wherein the prefix is associated with an owner of the web-based application.

10. A system for autonomously testing web-based applications, comprising:
    a memory including computer executable instructions; and a processor configured to execute the computer executable instructions and cause the system to:
  receiving a request to execute a path through a web-based application comprising a set of pages, wherein the path includes all pages of the set of pages associated with a plug-in of the web-based application;
  receiving a page of the set of pages from a server of the web-based application;
  searching the page of the web-based application for one or more fillable form fields;
  identifying a fillable form field in the page;
  determining a field type associated with the fillable form field;
  determining a field data format based on the field type of the fillable form field;
  generating a first test data entry including at least one non-numeric text string based on the field data format and a nationality of a hypothetical user associated with a test case, wherein the first test data entry causes the web-based application to advance along the path when submitted to the server;
  entering the first test data entry into the fillable form field;
  submitting the page and the first test data entry to the server;
  receiving, from the server, a next page of the set of pages wherein the next page is within the path through the web-based application; and
  until a threshold confidence level that all paths in the web-based application have been traversed is reached;
    generating a plurality of second test data entries, each of the plurality of second test data entries causing the web-based application to advance along a random path in the web-based application,
    entering the plurality of second test data entries into the fillable form field,
    submitting the page and each of the plurality of second test data entries to the server,
    receiving, from the server, a subsequent page of the set of pages is the random path through the web-based application, and
    determining that the threshold confidence level has been reached based on whether no new pages in the web-based application have been discovered for a threshold number of second test data entries.

11. The system of claim 10, the processor being further configured to cause the system to: determine an error associated with the identified fillable form field of the page.

12. The system of claim 10, the processor being further configured to cause the system to: receive an indication from the server of an error associated with the fillable form field of the page.

13. The system of claim 10, the processor being further configured to cause the system to:
  following entering the first test data entry into the fillable form field, determine the fillable form field is associated with a dependent field;
  determine a dependent field type associated with the dependent field;
  determine a dependent data format based on the dependent field type of the dependent field;
  generate a dependent test data entry based on the dependent data format; and
  enter the dependent test data entry into the dependent field.

14. The system of claim 10, wherein determining a field type associated with the fillable form field further comprises: identifying metadata associated with the fillable form field.

15. The system of claim 14, wherein the metadata comprises a hypertext markup language (HTML) tag.

16. The system of claim 11, the processor being further configured to cause the system to: capture an image of the page in response to determining the error.

17. The system of claim 11, the processor being further configured to cause the system to: storing a video of the page in response to determining the error.

18. The system of claim 10, wherein generating a test data entry based on the field data format further comprises concatenating a prefix to the test data entry, wherein the prefix is associated with an owner of the web-based application.

19. A non-transitory computer readable medium comprising instructions to be executed in a computer system, wherein the instructions when executed in the computer system perform a method for autonomously testing web-based applications, comprising:
  receiving a request to execute a path through a web-based application comprising a set of pages, wherein the path includes all pages of the set of pages associated with a plug-in of the web-based application;
  receiving a page of the set of pages from a server of the web-based application;
  searching the page of the web-based application for one or more fillable form fields;
  identifying a fillable form field in the page;
  determining a field type associated with the fillable form field;
  determining a field data format based on the field type of the fillable form field;
  generating a first test data entry including at least one non-numeric text string based on the field data format and a nationality of a hypothetical user associated with a test case, wherein the first test data entry causes the web-based application to advance along the path when submitted to the server;
  entering the first test data entry into the form field;
  submitting the page and the first test data entry to the server;
  receiving, from the server, a next page of the set of pages wherein the next page is within the path through the web-based application; and
  until a threshold confidence level that all paths in the web-based application have been traversed to reached:
    generating a plurality of second test data entries, each of the plurality of second test data entries causing the web-based application to advance along a random path in the web-based application,
    entering the plurality of second test data entries into the fillable form field,
    submitting the page and each of the plurality of second test data entries to the server,
    receiving, from the server, a subsequent page of the set of pages is the random path through the web-based application, and
    determining that the threshold confidence level has been reached based on whether no new pages in the web-based application have been discovered for a threshold number of second test data entries.

20. The computer readable medium of claim 19, the method further comprising: determining an error associated with the identified fillable form field of the page.

* * * * *